G. BRYDEN.
Manufacture of Horseshoes.
No. 206,858. Patented Aug. 13, 1878.
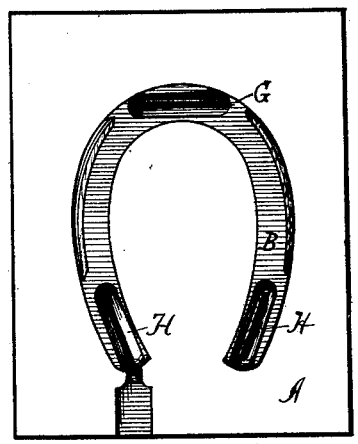
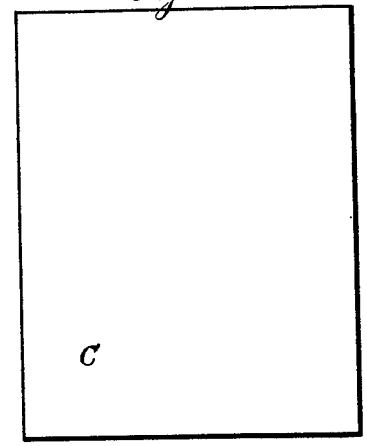
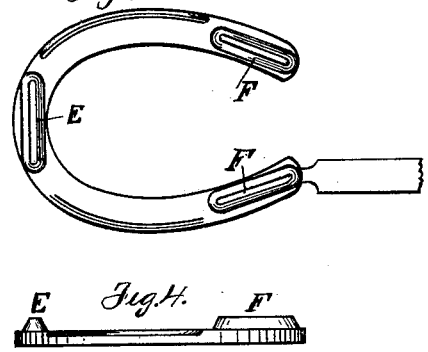
Witnesses:
Robt. F. Gaylord
Michael F. Dooley
Inventor:
Geo. Bryden
By W. E. Simonds
Atty

UNITED STATES PATENT OFFICE.

GEORGE BRYDEN, OF HARTFORD, CONNECTICUT.

IMPROVEMENT IN THE MANUFACTURE OF HORSESHOES.

Specification forming part of Letters Patent No. 206,858, dated August 13, 1878; application filed August 16, 1877.

*To all whom it may concern:*

Be it known that I, GEORGE BRYDEN, of Hartford, in the county of Hartford and State of Connecticut, have invented certain new and useful Improvements pertaining to the Manufacture of Horseshoes, of which the following is a specification, reference being had to the accompanying drawings, where—

Figure 1 is a face view of the lower die made use of. Fig. 2 is a face view of the upper die. Fig. 3 is a face view of the shoe. Fig. 4 is a side view of the shoe. Figs. 5, 6, and 7 are top, side, and end views, respectively, of one of the calks before its union with the body of the shoe.

The invention relates to the dies, process, and the making of such a shoe as is shown in Figs. 3 and 4.

The lower die, A, contains the matrix B, which forms and gives shape to the body of the shoe, the stock-bar being first properly heated and bent to horseshoe shape before submission to the dies.

The upper die, C, is plain or flat on its face, and is worked in a drop, press, or other proper apparatus.

The body of the shoe is of iron, and the calks E F F are of steel. In the bottom of the matrix B are calk-recesses G H H, into which the steel calks, first properly formed and heated, are laid, with their broader faces upward. The heated stock-bar is then laid in or over the matrix B, and the die C descends, forming the body of the shoe and securely welding the calks to the body of the shoe, also finishing the shape of the calks.

The dies are applicable to the welding and uniting of the shoe-body and the calks after both have been previously finish-formed.

The calk-blanks, it should be remarked, are but roughly formed when put into the dies for welding to the shoes—that is to say, they are not finished calks, but simply blanks, and they are shaped and finished in the dies, being formed complete and welded by one and the same operation.

I claim as my invention—

The manufacture of horseshoes in dies, consisting in placing heated calks in the rough within holding recesses, then placing the heated shoe body or stock in the matrix above such calks, and then welding the said calks and shoe-stock together, and at the same operation finishing the calks, substantially as specified.

GEO. BRYDEN.

Witnesses:
 BOBT. F. GAYLORD,
 W. E. SIMONDS.